United States Patent
Cheng et al.

(10) Patent No.: US 7,189,088 B2
(45) Date of Patent: Mar. 13, 2007

(54) CARD CONNECTOR WITH ANTI-MISMATING DEVICE

(75) Inventors: Yung-Chang Cheng, Tu-Cheng (TW); Chien-Jen Ting, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/322,630

(22) Filed: Dec. 30, 2005

(65) Prior Publication Data

US 2006/0286835 A1 Dec. 21, 2006

(30) Foreign Application Priority Data

May 27, 2005 (TW) .............................. 94208714 U (51) Int. Cl.
*H01R 13/62* (2006.01)
(52) U.S. Cl. ...................................... 439/159
(58) Field of Classification Search ................ 439/159, 439/160, 541.5, 630, 638; 360/98.04, 99, 360/740
See application file for complete search history.

(56) References Cited

U.S. PATENT DOCUMENTS

| | | | | |
|---|---|---|---|---|
| 6,977,795 | B2* | 12/2005 | Matsumura | 360/98.04 |
| D529,029 | S * | 9/2006 | Sekine | 439/638 |
| 7,101,222 | B2* | 9/2006 | Ho et al. | 439/541.5 |
| 2005/0079767 | A1 | 4/2005 | Molex | |

* cited by examiner

*Primary Examiner*—J. F. Duverne
(74) *Attorney, Agent, or Firm*—Wei Te Chung (57) ABSTRACT

A card connector includes an insulating housing (1,4); a number of contacts (2,3) received in the insulating housing and a shell (5). The shell (5) covers the insulating housing to define a card receiving space which has a first card receiving space (501) and a second card receiving space (502) along a vertical direction for receiving a first card (8) and a second card (9), respectively. The contacts comprise contacting portions (21,31) exposed into the first card receiving space (501) and the second card receiving space (502), respectively. The shell (5) is formed with a stopping portion (531) protruding into the second card receiving space (502) for preventing the first card from electrically connecting with the contacting portions exposed into the second card receiving space.

2 Claims, 10 Drawing Sheets

CARD CONNECTOR WITH ANTI-MISMATING DEVICE

BACKGROUND OF THE INVENTION

1. Field of the Invention

The present invention is generally related to a card connector, and especially to a card connector with anti-mismating means for assuring different size/type cards can be correctly received in corresponding receiving spaces.

2. Description of Related Art

At present, electrical cards are widely used in electrical appliances to accomplish signal transmission or signal storage function. Certainly, card connectors are indispensable for receiving the corresponding electrical cards. With requirements of larger capacity of the electrical appliances, on the one hand, enlarging capacity of the electrical cards themselves; on the other hand, adding quantities of the electrical cards which are received in the card connectors of the electrical appliances. Especially, a card connector adapted for accepting more electrical cards is needed.

US Application Publication No. 2005/0079767 discloses a card connector which accepts two different electrical cards. The card connector comprises an insulating housing with a plurality of contacts received in. The insulating housing defines an upper space and a lower space along a vertical direction for receiving a first card and a second card. Thickness of the first card is larger than that of the second card. Therefore, the second card can be inserted into the upper space by mistake. Thus, damaging the contacts exposed into the upper space or being damaged by the contacts. In this situation, it is important to assure the different cards to be properly received in their own card receiving space.

Hence, an improved card connector is highly desired to overcome the aforementioned disadvantages of the prior art.

SUMMARY OF THE INVENTION

Accordingly, an object of the present invention is to provide a card connector which has anti-mismating device to prevent electrical cards from mismating.

To achieve the above object, a card connector comprises an insulating housing; a plurality of contacts received in the insulating housing and a shell. The shell covers the insulating housing to define a card receiving space which has a first card receiving space and a second card receiving space along a vertical direction for receiving a first card and a second card, respectively. The contacts comprise contacting portions exposed into the first card receiving space and the second card receiving space, respectively. The shell is formed with a stopping portion protruding into the second card receiving space for preventing the first card from electrically connecting with the contacting portions exposed into the second card receiving space.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
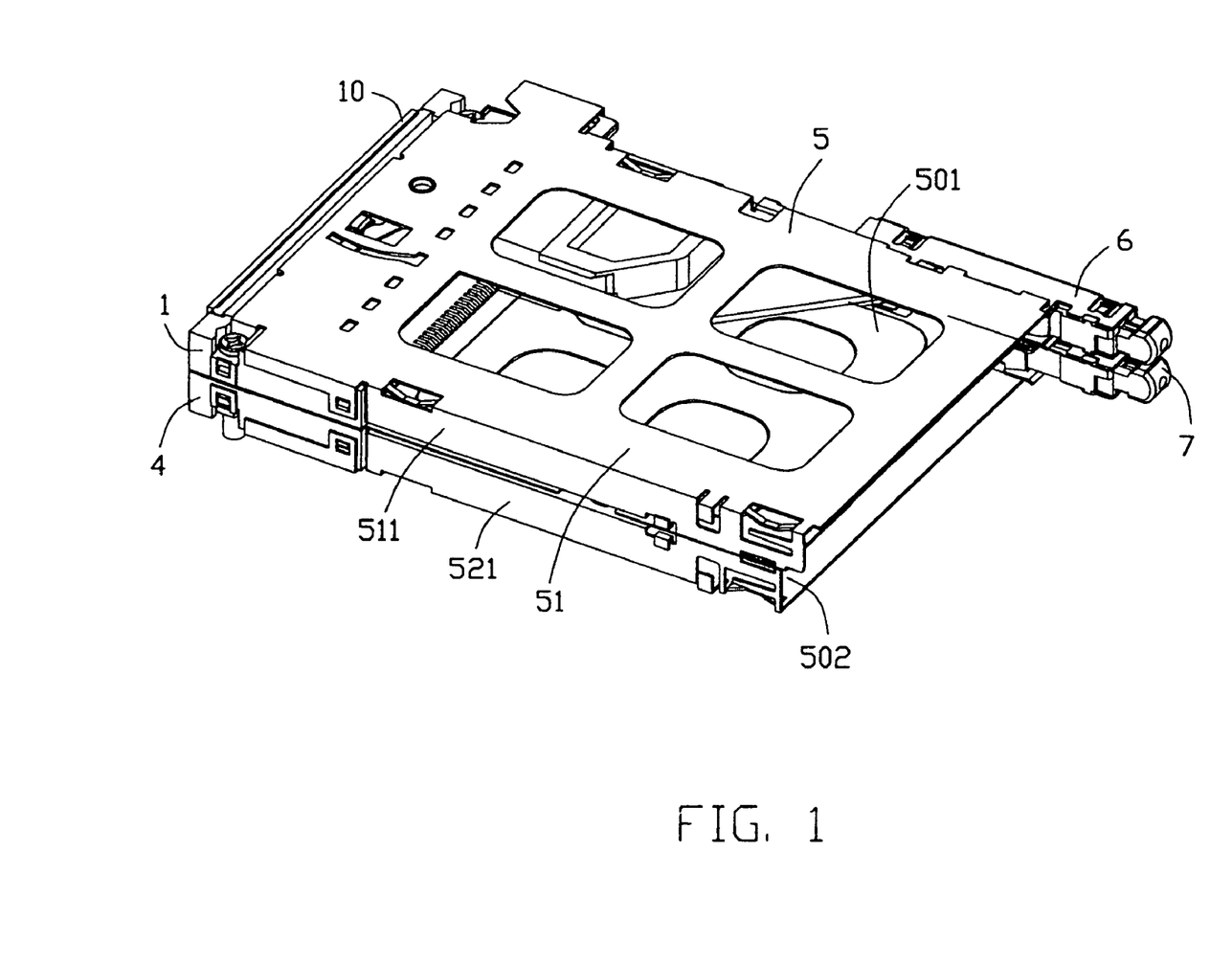
FIG. 1 is an assembled, perspective view of a card connector in accordance with the present invention.

Referring to FIG. 1, the card connector in accordance with the present invention is adapted for receiving a first card 8, such as an Express card, and a second card 9, such as a PC card. The card connector comprises an insulating housing, a plurality of contacts comprising a first contacts 2 and a second contacts 3, received in the insulating housing, a shell 5 covering the insulating housing, an ejector and a positioning member 10.

Figure 4:
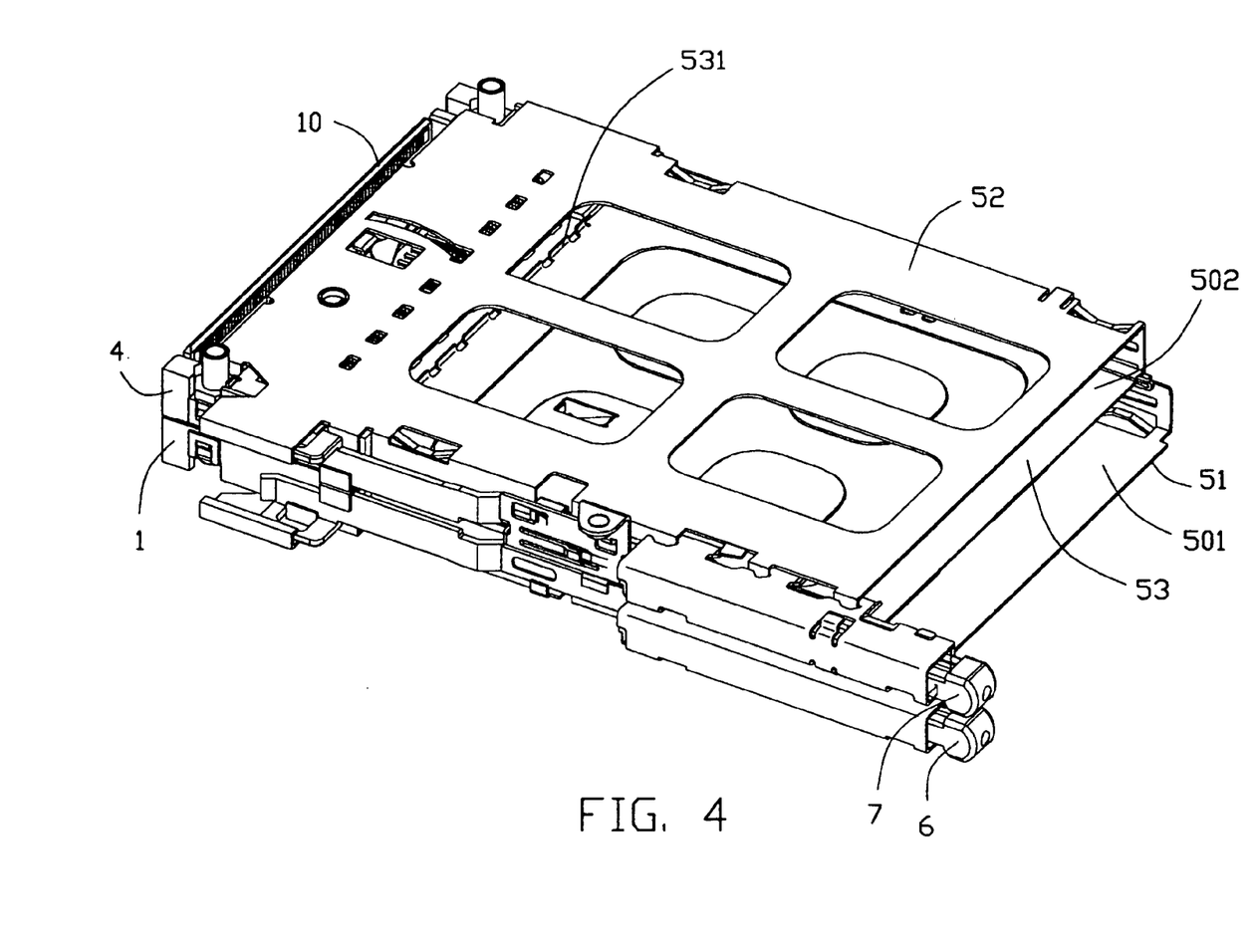
FIG. 4 is an assembled, perspective view similar to FIG. 1, but taken from another aspect.
Figure 5:
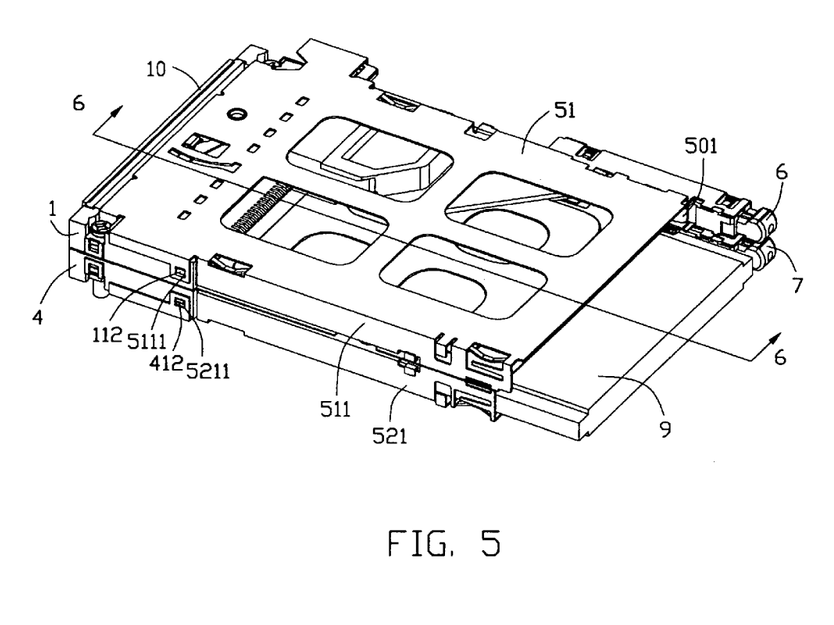
FIG. 5 is an assembled, perspective view similar to FIG. 1 with a second card properly received in a second card receiving space.
Figure 10:
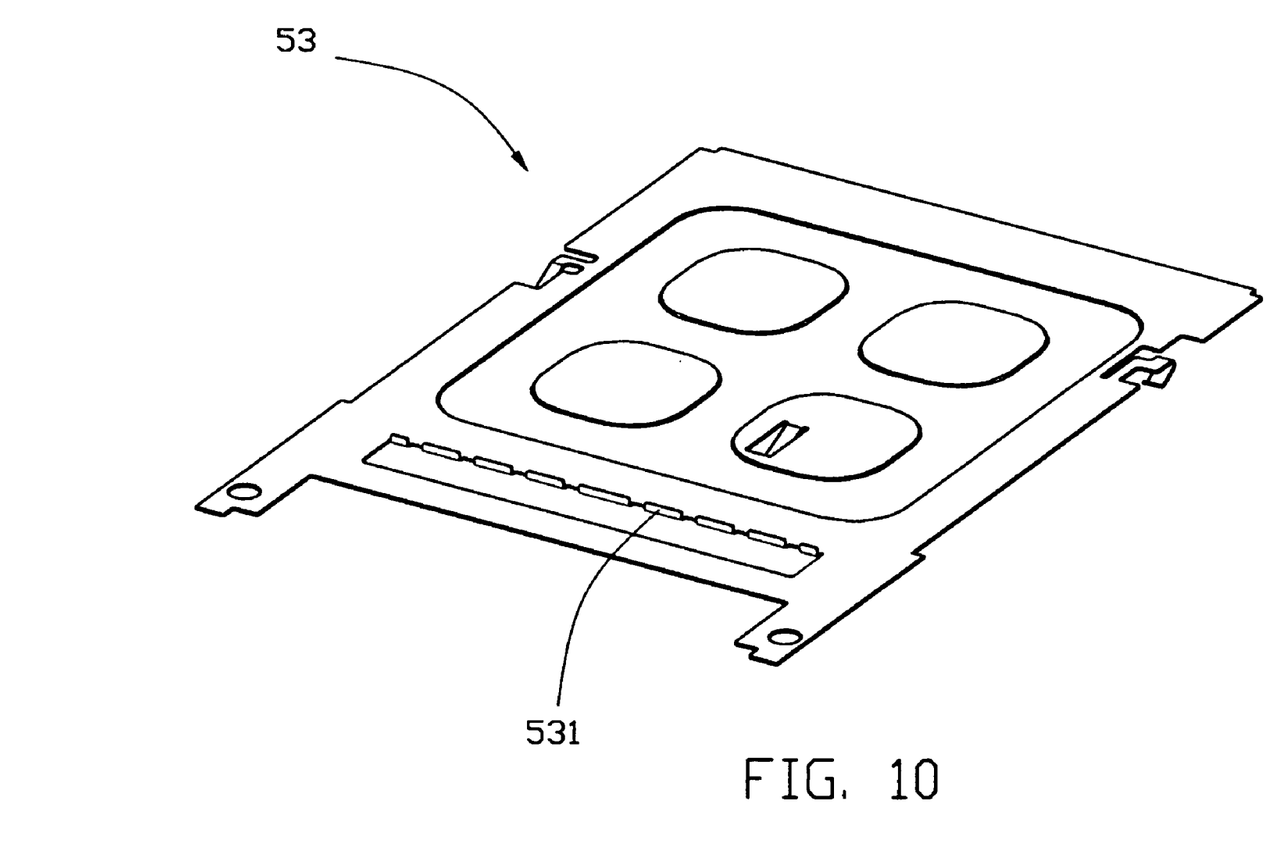
FIG. 10 is a perspective view of a partition shell of a shell of the card connector of FIG. 1 and taken from another aspect.

Referring to FIGS. 1, 4 and 10, the insulating housing comprises a first insulating housing 1 and the second insulating housing 4 stacked together with the first insulating housing 1 along a vertical direction. The shell 5 disposes on the insulating housing and the shell 5 comprises an upper shell 51 covering a top face of the first insulating 1 and a lower shell 52 covering a bottom face of the second insulating housing 4 to define a card receiving space (not labeled) among them. The shell 5 further comprises a partition shell 53 locating between the first shell 51 and the second shell 52 to divide the card receiving space into a first card receiving space 501 and a second card receiving space 502 along the vertical direction.

Figure 2:
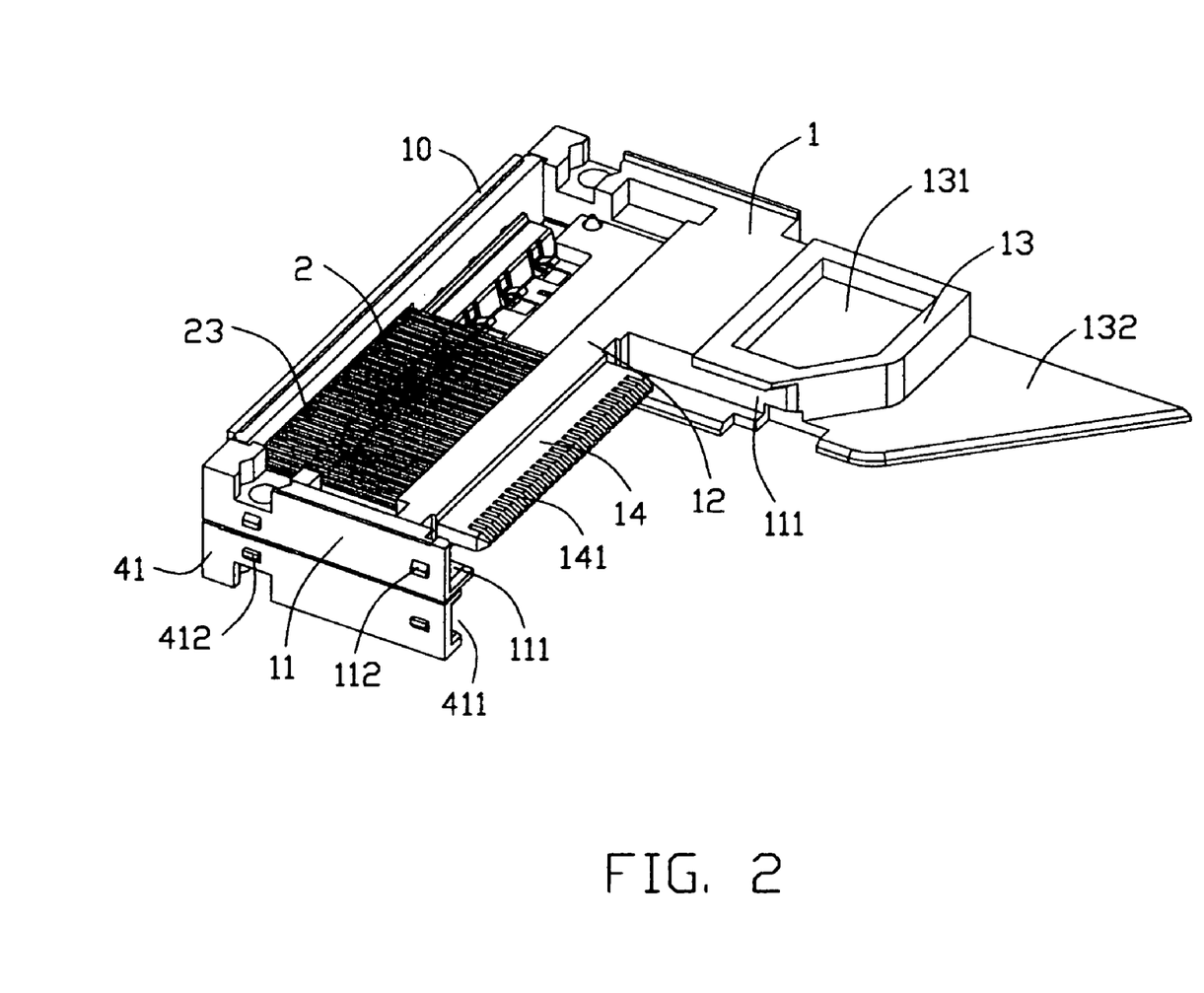
FIG. 2 is a perspective view of an insulating housing of the card connector of FIG. 1.
Figure 3:
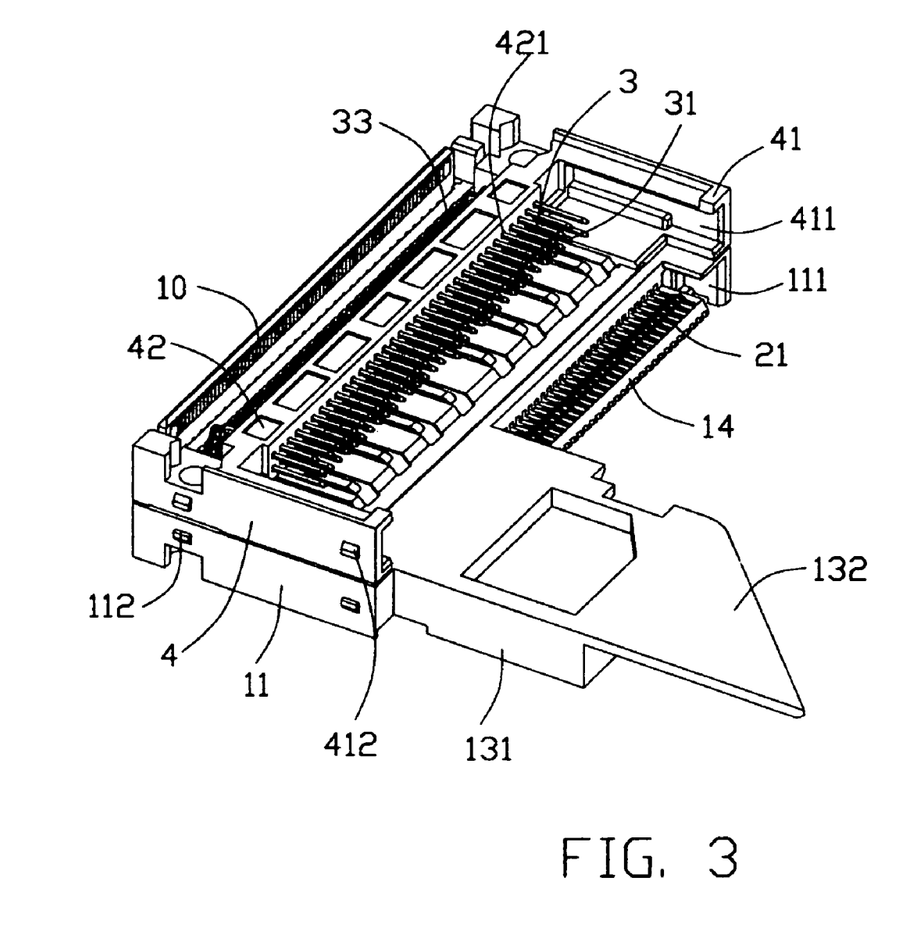
FIG. 3 is a perspective view similar to FIG. 2, but taken from another aspect.

Referring to FIGS. 2–3, the first insulating housing 1 is approximately L-shaped and formed with a first base portion 12 and a pair of first side arms 11 extending rearward from opposite lateral sides of the first elongated base portion 12 along a card ejecting direction into the first card receiving space 501. A mating portion 14 and a guiding portion 13 arranged side by side extend rearward form the first base portion 12 to locate between the first side arms 11 and expose into the first card receiving space 501. The guiding portion 13 is formed a first guiding portion 131 and a second guiding portion 132 extending rearward from the first guiding portion 131 to recognize the first card 8. Furthermore, opposite inner sides of the first guiding portion 131 and one of the side arms 11 define first guiding passages 111 to guide insertion of the first card 8 along a card insertion direction. A pair of first wedges 112 are disposed on outside of each side arm 11.

The first insulating housing 1 is formed with a plurality of receiving passages 141 disposed in the mating portion 14 and run forwardly through the first base portion 12 for receiving the first contacts 2. Each first contact 2 comprises a first contacting portion 21 received in the receiving passage 141 and exposed into the first card receiving space, a first connecting portion 23 extending forwardly from the first contacting portion 21 and a first soldering portion 22 extending beyond the first insulating housing from the first connecting portion 23 for soldering on a printed circuit board (not shown).

The second insulating housing 4 is approximately U-shaped configuration. The second insulating housing 4 comprises a second elongated base portion 42 and a pair of second side arms 41 extending rearward from opposite lateral sides of the second base portion 42. A pair of second wedges 412 are disposed on outside of each side arm 41 and second guiding passages 411 are defined in opposite inner sides of the side arms 41 to guide insertion of the second card 9. The base portion 42 defines a plurality contacting holes 421 for receiving the second contacts 3. Each second contact 3 comprises a second connecting portion 33 holding in the contacting hole 421, a second contacting portion 31 extending rearward from the connecting portions 33 to expose into the second card receiving space 502 and a second soldering portion 32 (shown in FIG. 8) extending forwardly beyond the second insulating housing 4.

The positioning member 10 is assembled to the insulating housing to securely hold the first and second soldering portions 22, 32.

Referring to FIGS. 4–10, the upper shell 51 comprises a upper main body (not labeled) and a pair of upper discrete sidewalls 511 extending downwardly from opposite sides of the upper main body. Front sections of the sidewalls 511 define a plurality of mating holes 5111 to mate with the first wedges 112 of the first insulating housing. The lower shell 52 has similar structures as the upper shell 51, defining a pair of lower discrete sidewalls 521. Front sections of the sidewalls 521 define holes 5211 to mate with the second wedges 412 of the second insulating housing 4. Rear sections of the upper sidewalls 511 and the lower sidewalls 521 lock together one another face to face. The partition shell 53 approximately locates between the upper sidewalls 511 and the lower sidewalls 521. The partition shell 53 is formed with a stopping portion 531 along a transverse direction, protruding into the second card receiving space 502 from a front edge of the partition shell 53 and spaced apart from the second contacting portions 31 along a card insertion direction. The stopping portion 531 comprises a plurality of protruding pieces (not labeled) arranged at intervals one another.

Ejectors 6 and 7 are mounted to the upper sidewall 521 and the lower sidewall 521 for ejecting the first card 8 and the second card 9, respectively.

Figure 6:
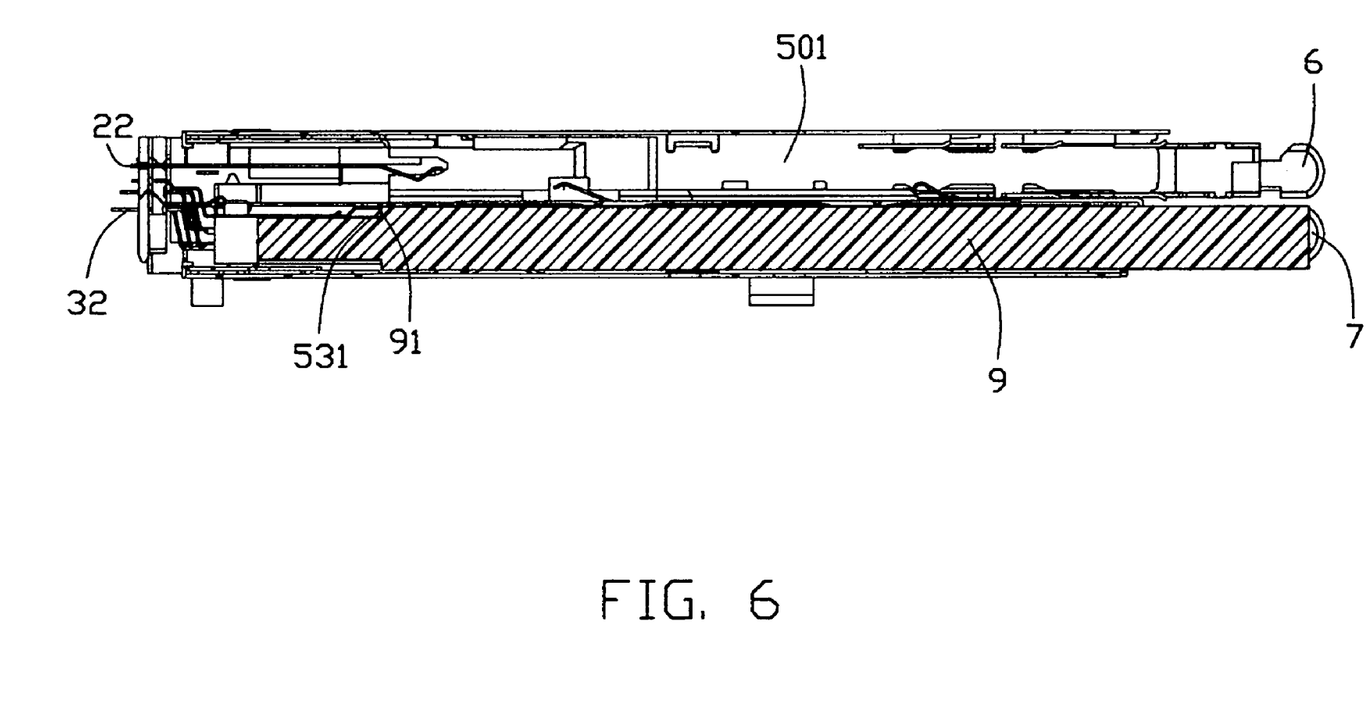
FIG. 6 is a cross-sectional view along line 6—6 of FIG. 5.
Figure 7:
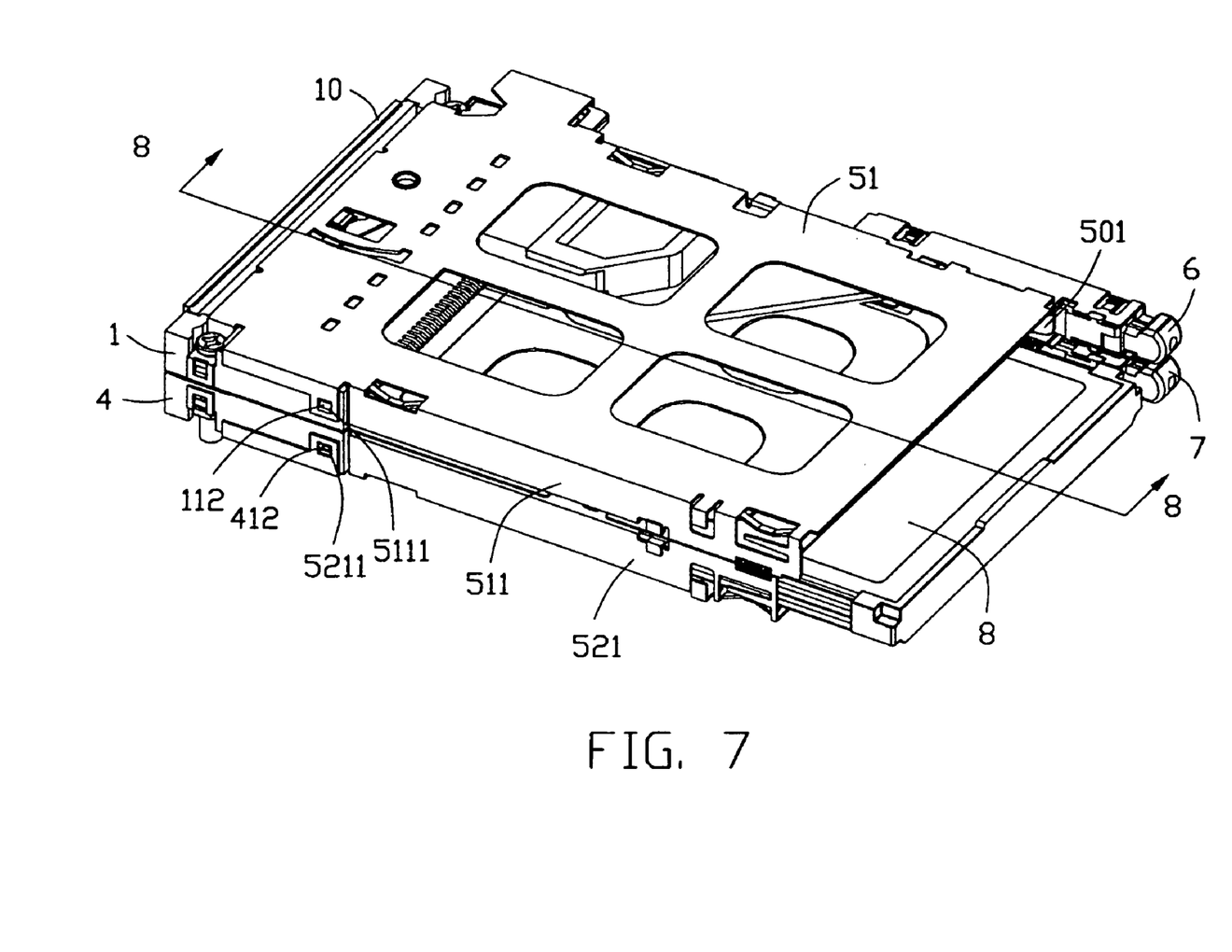
FIG. 7 is an assembled, perspective view similar to FIG. 1 with a first card improperly received in the second card receiving space.
Figure 8:
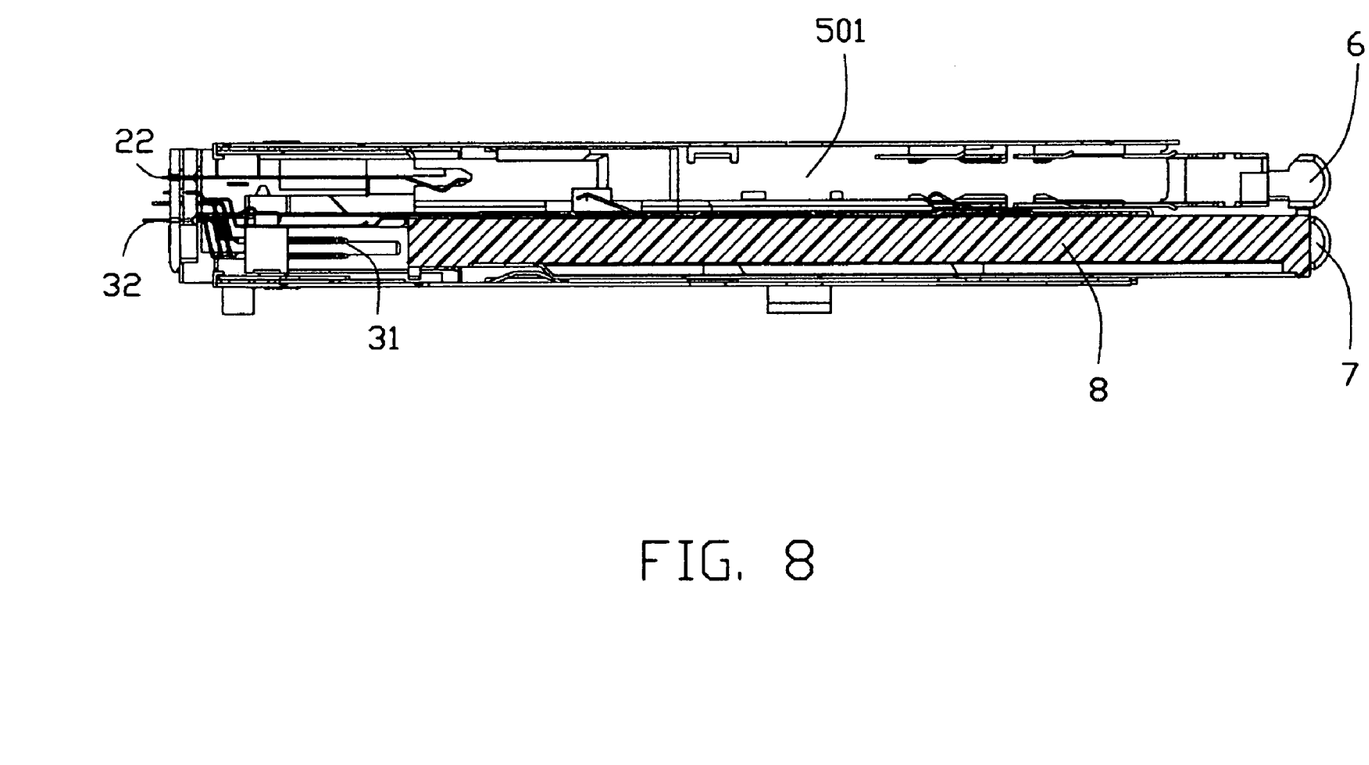
FIG. 8 is a cross-sectional view along line 8—8 of FIG. 7.
Figure 9:
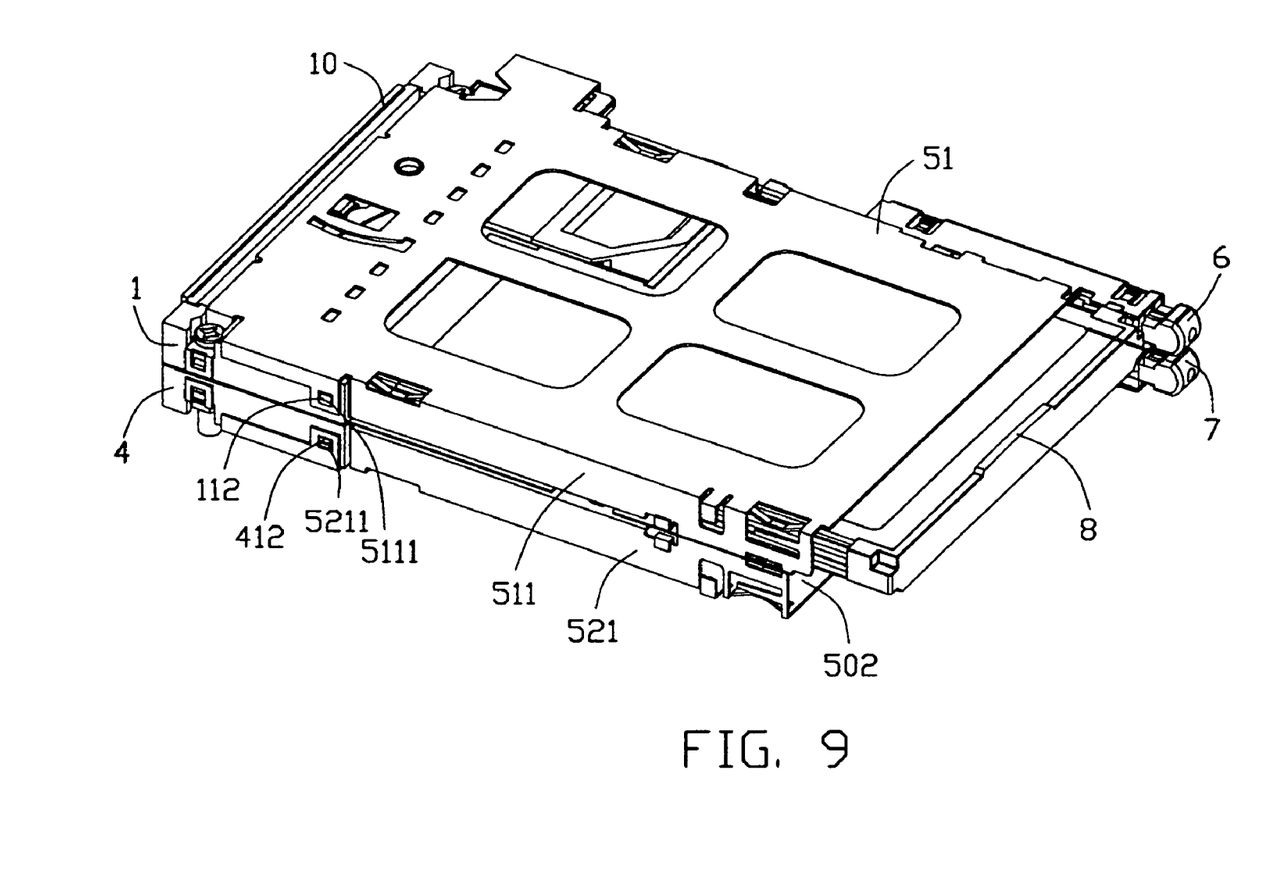
FIG. 9 is an assembled, perspective view similar to FIG. 1 with the first card properly received in a first receiving space.

Referring to FIGS. 6, 8 and 10, thickness of the second card 9 is larger than that of the first card 8, however, their widths are approximately equal. The first card 8 is approximately L-shaped in accordance with the configuration of the first insulating housing 1. The second card 9 is approximately rectangular configuration. Therefore, the second card 9 isn't inserted into the first card receiving space 501.

A front end of the second card 9 defines recess portions 91 recessed downwardly and upwardly from a top face and a bottom face of the second card 9. Thus, thickness of the front end of the second card 9 is shorter than a front end of the first card 8. When the second card 9 is properly inserted into its own card receiving space, the second card receiving space, the stopping portion 531 of the partition shell 53 relatively moves in the recess portion 91. Therefore, the stopping portion 531 can't collide with the front end of the second card 9, the front end of the second card 9 will properly connect with the second contacts 3.

When the first card 8 is inserted into the second card receiving space 502 by mistake, the stopping portion 531 of the shell 53 collides with the front end of the first card 8 because the thickness the front end of the first card 8 is shorter than that the front end of the second card 9. That is, the thickness of the front end of first card 8 is larger than distance between the stopping portion 531 and the main body of the lower shell 53. Therefore, the first card can't be inserted into the second card receiving space 502.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector assembly, comprising:
an insulating housing;
a plurality of contacts received in the insulating housing;
a shell covering the insulating housing to define a card receiving space which has a first card receiving space and a second card receiving space along a vertical direction receiving a first card and a second card, respectively, the contacts comprising contacting portions exposed into the first card receiving space and the second card receiving space, respectively; and
a front portion of the shell equipped with a stopping portion extending in a vertical direction into the second card receiving space preventing the first card from being mistakenly thereinto to electrically connect with the contacting portions exposed into the second card receiving space; wherein the first card has a larger vertical dimension at a front end thereof than the second card.

2. A card connector assembly comprising:
an insulative housing with terminals thereon;
a shell covering said housing and defining a card receiving space thereof in confrontation with said housing;
a front portion of the shell equipped with a stopping portion extending in a vertical direction into the card receiving space for preventing a first card from being mistakenly thereinto to electrically connect with the terminals exposed into the card receiving space while allowing a second card to be inserted into the card receiving space; wherein the first card has a larger vertical dimension at a front end thereof than the second card while the remaining portions are the same.

* * * * *